Dec. 13, 1932.   A. S. FITZ GERALD   1,891,084
ELECTRIC POWER CONVERTING APPARATUS
Filed May 12, 1931
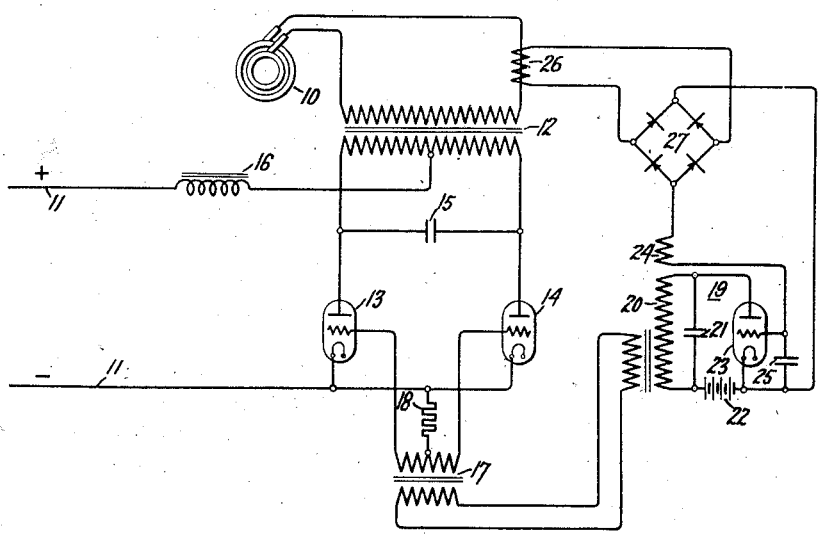
Inventor:
Alan S. FitzGerald,
by Charles E. Mullen
His Attorney.

Patented Dec. 13, 1932

1,891,084

UNITED STATES PATENT OFFICE

ALAN S. FITZ GERALD, OF WYNNEWOOD, PENNSYLVANIA, ASSIGNOR TO GENERAL ELECTRIC COMPANY, A CORPORATION OF NEW YORK

ELECTRIC POWER CONVERTING APPARATUS

Application filed May 12, 1931. Serial No. 536,819.

My invention relates to electric power converting apparatus and more particularly to such apparatus including electric valves for transmitting energy from a direct current supply circuit to an alternating current load circuit.

Heretofore there have been proposed numerous arrangements including electric valves for transmitting energy from a direct current supply circuit to an alternating current load circuit. These apparatus have come to be known in the art as inverters. The frequency of the alternating current delivered by an inverter may be determined by exciting the control grids of the electric valves from the output of the inverter, in which case the frequency is dependent upon the constants of the circuit, or by driving the grids of the electric valves from an independent source of alternating current. My invention relates more particularly to an arrangement of the latter type in which the frequency of the alternating current delivered by the inverter may be either controlled or automatically regulated over wide limits of frequency variation.

It is an object of my invention to provide an improved electric power converting apparatus utilizing electric valves in which the frequency of the alternating current delivered by the apparatus may be regulated or controlled over wide limits of frequency variation.

It is a further object of my invention to provide an improved electric power converting apparatus utilizing electric valves in which the frequency of the alternating current delivered by the apparatus is determined by a uni-directional potential the magnitude of which may be either manually controlled or automatically regulated in response to an operating condition of the apparatus.

In accordance with my invention the control grids of the electric valves of an inverter of any of the several types well known in the art are driven by means of an independent oscillating circuit including a high vacuum pure electron discharge valve. The frequency of oscillations of this circuit, and hence the frequency of the alternating current delivered by the inverter, is determined by means of a uni-directional potential bias impressed upon the control grids of the high vacuum valve. This uni-directional potential may be manually controlled or may be regulated automatically in response to any operating condition of the apparatus or some associated apparatus. By way of example I have illustrated an arrangement in which the uni-directional potential is dependent upon the magnitude of the current taken by the load circuit of the inverter, which may be used to supply an alternating current motor. In such an arrangement the motor, which may be either a synchronous or an induction motor, is given the characteristics of a series motor. However, the broad feature of controlling the frequency of an electric valve inverter in response to the load on the inverter forms no part of my present invention but is disclosed and broadly claimed in the copending application of E. F. W. Alexanderson, Serial No. 638,361, filed May 11, 1923 and assigned to the same assignee as the present application.

For a better understanding of my invention, together with other and further objects thereof, reference is had to the following description taken in connection with the accompanying drawing, and its scope will be pointed out in the appended claims. The single figure of the accompanying drawing is a diagrammatic representation of my invention as applied to an arrangement for varying the frequency of the current supplied to an alternating current motor in response to variations in load on the motor.

Referring now to the drawing, I have illustrated an arrangement for driving an alternating current motor 10 from a direct current circuit 11 by means of an electric valve inverter. This inverter may be any of the several types well known in the art, but I have illustrated by way of example a parallel inverter such as that disclosed and claimed in United States Letters Patent No. 1,800,002, granted April 7, 1931, upon the application of E. F. W. Alexanderson. This inverter comprises a transformer 12 having a secondary winding connected to motor 10 and a primary winding connected to the direct current circuit 11 through a pair of electric valves 13 and 14, and a commutating capacitor 15 connected between the electric valves. If desired, a smoothing reactor 16 may be connected in series with the direct current circuit 11. Electric valves 13 and 14 are each provided with an anode, a cathode and a control grid and may be of any of the several types well known in the art, although I prefer to use valves of the vapor electric discharge type. The grids of electric valves 13 and 14 are connected to their common cathode circuit through opposite halves of the secondary winding of a grid transformer 17 and a current limiting resistor 18. To determine the frequency of the alternating current delivered by the above described inverter, the primary winding of grid transformer 17 is energized from a vacuum valve oscillator 19. This oscillator 19 may be of any of the several types well known in the art and, for example, may comprise a resonant circuit made up of parallel connected inductive winding 20 and capacitor 21 adapted to be energized from a source of direct current, shown as a battery 22, through a high vacuum pure electron discharge valve 23. The grid circuit of the valve 23 is inductively related to the plate circuit of the oscillator by means of inductive winding 24 and includes a source of uni-directional bias potential for controlling or regulating the frequency of oscillation. A capacitor 25 is preferably connected between the grid and cathode of the valve 23. The uni-directional bias potential for the grid circuit of the valve 23 may be supplied from a manually controllable source or from a source of uni-directional potential variable in accordance with any operating condition of the apparatus, such, for example, as the speed of the motor 10 or the voltage, current, power factor, or power delivered to it by the inverter. By way of example I have illustrated an arrangement for supplying a uni-directional potential variable in accordance with the current supplied to the motor 10. This arrangement comprises a series transformer 26 connected in the line of the motor 10 and a rectifier bridge 27, one diagonal of the bridge being connected to the secondary winding of the series transformer and the other diagonal thereof furnishing the uni-directional bias potential.

The general principles of operation of a parallel inverter as described above will be well understood by those skilled in the art or may be found in detail in the above Alexanderson patent. In brief, while one of the valves 13 or 14 is conductive the capacitor 15 becomes charged to substantially twice the potential of the direct current circuit. When the other valve is made conducting the capacitor 15 is short-circuited through the two valves in such a way as to instantly interrupt the current in the first valve, thus transferring the load current from one valve to the other and reversing the direction of its flow through the transformer 12. The frequency of these reversals and thus the frequency of the alternating current delivered by the transformer 12 to the motor 10 is determined by the frequency of the grid excitation supplied to the transformer 17. Similarly, the operation of a vacuum tube oscillator 19 will be well understood by those skilled in the art and a detailed explanation is not deemed necessary. It is well known that the frequency of oscillation of such an oscillator may be controlled or regulated by varying a uni-directional bias potential in the grid circuit. Considering the operation of the apparatus as a whole, it will be assumed that, initially, the frequency of the alternating current delivered by the inverter to the motor 10 is such as to maintain the proper speed of the motor 10 under existing load conditions. If the load on the motor 10 tends to increase, the increase in current flowing in the motor circuit will increase the uni-directional bias potential supplied by the series transformer 26 and the rectifier bridge 27 and thus decrease the frequency of oscillations produced by the oscillator 19. A decrease in the frequency of the oscillations of the oscillator 19, and thus the frequency of the grid excitation supplied the transformer 17, will decrease the frequency of the alternating current output of the apparatus to correspond to the changed load condition. Obviously with a decrease in load on the motor 10, the corresponding increase in speed will take place thus giving the motor 10 the characteristics of a series motor.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, a direct current supply circuit, an alternating current load device, means for transmitting energy therebetween including a plurality of electric valves provided with control grids, a source of electrical oscillations for exciting said control grids to determine the frequency of the alternating current delivered by said apparatus, said source including an electric valve provided with a control grid, and means for impressing upon the grid of said last mentioned valve a uni-directional potential variable in magnitude to vary the frequency of said electrical oscillations.

2. In combination, a direct current supply circuit, an alternating current load device, means for transmitting energy therebetween including a plurality of electric valves provided with control grids, an electric valve oscillator for exciting said grids, and determining the frequency of the alternating current delivered by said apparatus, and means responsive to an operating condition of said load device for controlling the oscillation frequency of said oscillator.

3. In combination, a direct current supply circuit, an alternating current load device, means for transmitting energy therebetween including a plurality of electric valves provided with control grids, an electric valve oscillator for exciting said grids, said oscillator including an electric valve provided with a control grid, means for producing a uni-directional potential variable in magnitude in accordance with an operating condition of said device, and a circuit for impressing said uni-directional potential upon the grid of said last mentioned valve to regulate the frequency of the alternating current delivered by the apparatus.

4. In combination, a direct current supply circuit, an alternating current load device, means for transmitting energy therebetween including a plurality of electric valves, means for producing a uni-directional potential variable in magnitude in accordance with current drawn by said load device, and means for varying the frequency of the alternating current delivered by said apparatus inversely with variations of said uni-directional potential.

5. In combination, a direct current supply circuit, an alternating current motor, apparatus for energizing said motor from said supply circuit including a plurality of electric valves provided with control grids, an electric valve oscillator for exciting said control grids including an electric valve provided with a control grid, a series transformer included in the connections to said motor, means for rectifying the output of said transformer, and a circuit for impressing said rectified output upon the grid of said oscillator valve whereby said motor is given the speed characteristics of a series motor.

In witness whereof, I have hereto set my hand.

ALAN S. FITZ GERALD.